United States Patent [19]

Smith et al.

[11] Patent Number: 5,251,597

[45] Date of Patent: Oct. 12, 1993

[54] ENGINE AIR SUPPLY SYSTEMS

[75] Inventors: Darren A. Smith, Scarborough; Robert M. Davis, Maylands, both of Australia

[73] Assignee: Orbital Engine Company (Australia) Pty Limited, Balcatta, Australia

[21] Appl. No.: 721,576

[22] PCT Filed: Feb. 19, 1990

[86] PCT No.: PCT/AU90/00063

§ 371 Date: Aug. 2, 1991

§ 102(e) Date: Aug. 2, 1991

[87] PCT Pub. No.: WO90/09516

PCT Pub. Date: Aug. 23, 1990

[30] Foreign Application Priority Data

Feb. 17, 1989 [AU] Australia ............... PJ2785

[51] Int. Cl.$^5$ ............... F02D 41/08
[52] U.S. Cl. ............... 123/339; 123/585
[58] Field of Search ............... 123/339, 585

[56] References Cited

U.S. PATENT DOCUMENTS

| | | | |
|---|---|---|---|
| 4,335,689 | 6/1982 | Abe et al. | 123/339 |
| 4,392,467 | 7/1983 | Miyagi et al. | 123/339 X |
| 4,617,889 | 10/1986 | Nishimiya et al. | 123/339 |
| 4,691,675 | 9/1987 | Iwaki | 123/339 |
| 4,714,064 | 12/1987 | Imazu | 123/339 |
| 4,716,871 | 1/1988 | Sakamoto et al. | 123/339 |
| 4,932,371 | 6/1990 | Albertson et al. | 123/339 X |

FOREIGN PATENT DOCUMENTS 3835512  5/1989  Fed. Rep. of Germany.

Primary Examiner—Willis R. Wolfe
Attorney, Agent, or Firm—Nikaido, Marmelstein, Murray & Oram

[57] ABSTRACT

An internal combustion engine air supply system having a first air intake passage (11) through which air can flow to the engine (8) with a driver actuated mechanism operatively coupled to a first control means (12) to vary the air flow through the primary passage (11) to the engine (8) in response to the driver demand and a second air intake passage (13) through which air can flow to the engine (8) with an actuator means operable in response to sensed engine operating conditions to operate a second control means (5) to vary the air flow through the second passage (13) to the engine (8); the first control (12) means and second control means (5) being operable independently, so that the air supplied to the engine (8) may pass solely through one of the first (11) or second (13) air passages or simultaneously through both.

49 Claims, 5 Drawing Sheets

ENGINE AIR SUPPLY SYSTEMS

This invention relates to the controlling of the air supply to an internal combustion engine to enable the establishment of the correct air/fuel ratio in the engine cylinders for combustion of the fuel in an efficient and controlled manner.

There is currently a wide range of equipment available for the management of internal combustion engines, and in particular, the management of the combustion process in such engines. There is currently a trend towards such management systems, commonly referred to as drive-by-wire systems, wherein the driver has no direct mechanical control over either the fuel supply or air supply to the engine, both being managed by appropriate programs incorporated in an ECU. In such systems, the accelerator pedal or throttle control, operated by the driver, generates an electrical input signal to the ECU that indicates the power output required by the driver from the engine. From this input, and taking into account inputs from other engine parameters, such as temperature and speed, the ECU determines both the fuel and air requirements of the engine and operates appropriate apparatus to comply with these demands.

In such systems an electric motor is employed to control the air supply such as by varying the position of a throttle valve located in the engine air supply passage. This motor is activated by signals from the ECU to position the throttle valve in the appropriate position so the required rate of supply of air to the engine will be achieved. The electric motor must therefore be capable of providing a rapid response to changes in air supply requirements while also providing accuracy in positioning of the throttle valve. The rapid response and accuracy in positioning of the throttle valve must also be obtained with the throttle valve operating in a duct carrying the total air supply to the engine, and therefore subject to substantial forces that influence the energy required to move the throttle valve. Accordingly, such electric motors represent a significant cost in the overall engine management system and in many situations this cost can not be justified.

A lesser concern with engines having an electric motor driven throttle valve, or other air control devices as the sole air supply control, is the fact that a breakdown in the motor operation renders the engine unworkable. This can be a serious problem in engines installed in motor vehicles or boats as the vehicles or boat is immobilised and the occupants may be placed in danger or seriously inconvenienced. Accordingly, in engines for such uses, it is usually necessary to provide some alternate form of air control which would permit the engine to at least be kept operating and provide what is commonly referred to as a "limp home capacity".

The alternative to an electric motor driven air control device is to provide a mechanical coupling between the driver operated throttle or accelerator control and the air control device in the air intake system, and to then provide a sensor in the air intake system to indicate the rate of air supply to the engine. A signal from that sensor is fed to the ECU as an input to the determination of the required fuel supply of the engine. This system avoids the high cost of the motor as required in the drive-by-wire system, and inherently provides a limp home capacity, since it is normally possible to make temporary repairs to mechanical couplings between the throttle valve and the throttle or accelerator control. However, the employment of the mechanically coupled throttle valve reduces the level of accuracy that can be obtained in the control of the air flow to the engine.

Also under low to medium load conditions, it is frequently desirable to maintain a relatively steady rate of air supply to the engine, or at least small variations therein for relatively greater variations in fuel supply. This requirement presents difficulties in attainment in a practical engine where the driver required power output from the engine is initially determined from the change of air flow in the engine air intake system.

The present invention is aimed at providing an engine management system wherein the above problems of the current systems are overcome or substantially reduced, and the cost of the system is commercially acceptable.

With this object in view, there is provided an internal combustion engine air supply system comprising a first air intake passage through which air can flow to the engine;

a first control means operable to vary the air flow through the first passage;

a driver actuated mechanism operatively coupled to said first control means to vary the air flow through the first passage to the engine in response to the driver demand;

a second air intake passage through which air can flow to the engine;

a second control means operable to vary the air flow through the second passage to the engine; and an actuator means operable in response to sensed engine operating conditions to operate the second control means to vary the air flow through the second passage to the engine;

said first control means and second control means being operable independently, so that the air supplied to the engine may be solely through the first or second passage or simultaneously through both.

Conveniently the driver actuated mechanism is arranged so that over at least part of the low to medium range of engine load the first control means is not operated and so there is substantially no, or a substantially fixed minimum, air flow to the engine through the first air intake passage. While the engine is operating in this part of the load range, the air required by the engine is supplied substantially only through the second air intake passage. The rate of air supplied through the second air intake passage is determined by an ECU programmed to determine the air requirement of the engine in response to signals received indicating various engine operating conditions, including load demand, that enables the ECU to determine the engine fuel requirement, and from that, the engine air requirement. The input to the ECU may include one indicative of the extent of movement of a driver actuated mechanism, such as an accelerator pedal or hand throttle control which relates to the load demand on the engine.

Preferably the driver actuated mechanism includes a lost motion feature so that during an initial portion of the driver induced movement of the mechanism, from an engine idle position, no corresponding movement is imparted to the first control means. After the mechanism has effected this initial portion of its movement from the idle position, further movement actuates the first control means to progressively increase the rate of air flow to the engine through the first air passage.

During the period of operation of the engine while the mechanical mechanism is operating in the lost motion phase, the air supply to the engine through the second passage is completely under the control of the second control means. However, it is possible to continue to supply air through the second passage after the first control means has commenced to be actuated by the mechanical mechanism. This enables the second control means to be operated to provide a controlled supplement quantity of air in addition to the air supply through the first passage, thus providing a "trimming" capability in respect of the total air supply to the engine.

Conveniently the first control means is a throttle valve operably located in the first passage. The throttle valve is coupled by a mechanical mechanism to a throttle lever or acceleration pedal located to be actuated by the driver of the engine. The mechanical mechanism incorporates a lost motion feature as referred to above, and co-operates with a position sensing device to provide an input to the ECU controlling the engine, that input being representative of the load on the engine set by the driver through the accelerator pedal. The position sensing device is connected to the mechanical mechanism prior to the lost motion feature.

The input from the position sensing device together with inputs relating to other engine conditions to the ECU are used in calculating the engine fuel requirement and engine air requirement to achieve the required air/fuel ratio. An air flow sensor device is preferably positioned to determine the total air supply to the engine through the first and second air passages. The output of the air flow sensor device is fed to the ECU so the actual and the calculated air supplies are compared and if a correction to the rate of air supply is required the ECU effects an appropriate input to the actuator means to adjust the secnd control means so the air supply is corrected in relation to the fuel supply to achieve the required air/fuel ratio.

The provision of the first air intake passage and the first control means therefor, that is driver actuated, provides a limp home capacity and also avoids the necessity to provide a high cost electric motor to effect the control of the total air supply to the engine. However, the provision of the additional second air supply passage with its own independent control means, which may be driven by an electric motor under direct control from the ECU, provides a high degree of accuracy in the control of the air supply under all operating conditions. However, because of the reduced quantity of air required under low to medium load conditions and the reduced level of variation therein, the electric motor driving the control on the second air supply passage can be relatively small and of simplified construction, hence less expensive than motors conventionally used on air supply systems.

The second air supply passage with independent control means managed by the ECU also provides a capacity to regulate other operations of the engine. In the operation of an engine, a problem can arise in the engine overrunning when the load is suddenly reduced or decoupled from the engine. This occurs in vehicles during gear changing and is particularly experienced with the two stroke cycle engine where the inherent braking load on the engine is relatively low compared with four stroke cycle engines.

In order to increase the braking load on the engine during overrun conditions, the second control means can be activated by the ECU to permit maximum air flow through the second air passage to the engine. This increases the pumping work performed by the engine so increasing the braking load and reducing the level of engine overrun. It has been found that at engine speed in the medium to high range, this pumping work is significant in increasing the braking load. However, in the lower speed range, more benefit is obtained by closing both the first and second air passages to create a high level of vacuum therein.

The ECU controlling the operation of the second control means is programmed to detect a sudden decrease in engine load of a level to induce engine overrun and if the engine speed is also in the medium to high range, such as for example, over about 2000 to 2500 RPM, the ECU will activate the second control means to povide maximum air flow through the secondary air passage. The ECU is also programmed to not respond to the resulting increase in air flow as detected by the air flow sensor and attempt to correct the air/fuel ratio, when the engine is experiencing overrun.

The invention will be more readily understood from the following description of one practical arrangement of the air supply control system as illustrated in the accompanying drawings.

Figure 1:
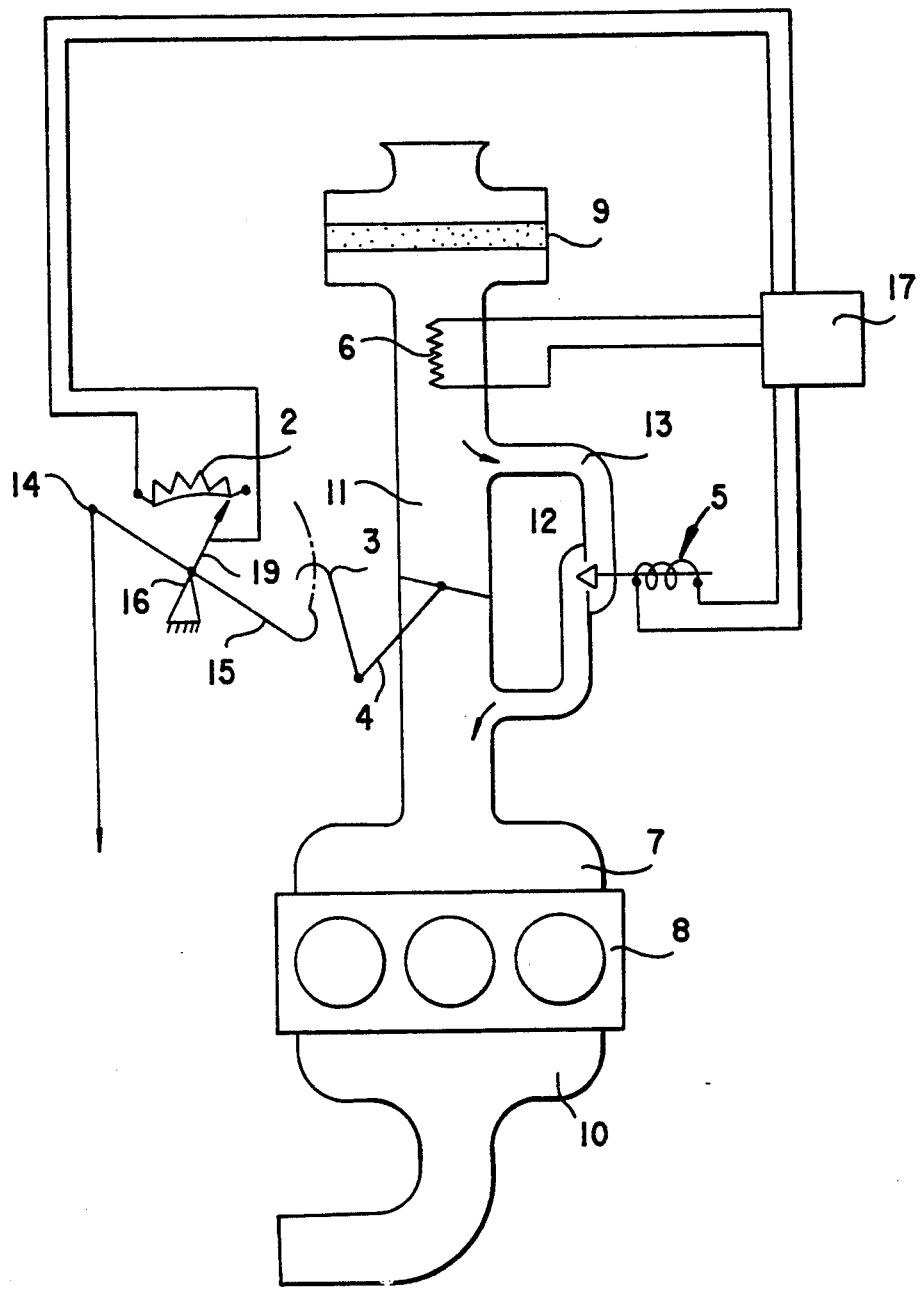
FIG. 1 is a diagramatic layout of the air induction system and the control thereof.

Referring now to FIG. 1 of the drawings, the three cylinder engine 8 includes an air intake manifold 7 and an exhaust manifold 10. The intake manifold 7 is in communication with the primary induction passage 11 which receives air through a conventional air filter box 9. Mounted in the primary induction passage 11 is a throttle valve 12, supported to pivot about an axis transverse to the passage 11, and coupled to an actuating arm 4.

A secondary, or by-pass passage 13 communicates with the primary induction passage 11 both upstream and downstream of the throttle valve 12, thereby providing a by-pass so air can flow to the engine even when the throttle valve 12 is in the closed position. Incorporated in the secondary passage 13 is a motor 5 operated flow control valve 18.

An air flow sensor 6 is provided in the primary intake passage upstream of the location where the secondary passage communicates with the primary passage on the upstream side of the throttle valve 12. The sensor 6 therefore senses the total air supply to the engine via both the primary and secondary passages.

The arm 4 connected to the throttle valve 12 is coupled through a linkage 14 to the accelerator pedal or throttle control as provided for operation by the driver in control of the engine 8. The linkage 14 includes the arm 15 pivoted at 16 and coupled to the arm 4 through a lost motion mechanism indicated diagramatically at 3. The arm 15 carries the wiper blade 19 of a potentiometer 2 which provides an input to the ECU 17, indicative of the position of the driver actuated linkage 14 prior to the lost-motion mechanism.

In operation, as the driver actuates the linkage 14 from an idle position, the potentiometer 2 will provide a signal to the ECU 17 indicating the load demand of the engine. The ECU will determine therefrom the fuel required by the engine and the air flow into the engine necessary to achieve the desired air/fuel ratio in the engine combustion chamber. The ECU then issues an appropriate signal to active the motor 5 to position the valve 18 so that the required amount of air will flow through the secondary passage 13 to the engine manifold 7.

Whilst the engine is operating the ECU will also receive input from the air flow sensor 6 indicating the actual total air flow to the engine and will make any appropriate adjustment to the position of the valve 18 to achieve the correct rate of air supply for the required air/fuel ratio in the engine combustion chamber.

Due to the incorporation of the lost motion mechanism 3, the initial movement of the linkage 14 will not produce a corresponding movement of the throttle valve 12 in the primary passage 11 so that all the air required by the engine is supplied through the secondary passage. There may of course be a minor leakage of air past the throttle valve 12, but such leaked air Will be included in the total air flow as detected by the air flow sensor 6 and so be taken into account by the ECU in determining the required position of the valve 18.

As the engine load demand increases, the link 14 will reach a position wherein the extent of lost motion provided by the mechanism 3 has been taken up. Further movement of the linkage 14, including the arm 15, induced by the driver, will effect a corresponding movement of the throttle valve 12 to permit a controlled air flow through the primary passage 11 to the engine. The air flow sensor 6 will continue to provide an input to the ECU 17 indicative of the actual total air flow to the engine and any minor correction required to the rate of air supply can be effected by operation of the valve 18.

The above described air control system enables accurate control of the air supply to the engine to be effected via the secondary passage 13 and the valve 18 at low to medium loads, whilst under higher operating loads the air flow will be principally controlled by the throttle valve 12, but may be adjusted to a degree by the operation of the valve 18.

The above air control system has been found to be particularly advantageous in the control of the level of exhaust emission of engines, as it provides greater control over the air/fuel ratio of the mixture burnt in the combustion chamber. The greater control arises from the secondary air passage and the ECU controlled valve 18 to adjust that air supply independently of the throttle valve position, and is further assisted by the use of a closed loop feed-back system in respect of the air supply to the engine.

This capability his been employed in controlling NOx in two stroke cycle engines by limiting the air supply as the load increases in the low and medium load range, thereby enriching the mixture and so reducing the combustion temperature. It has been found that the total air supply of the can be provided through the secondary air passage under the control of the valve 18 over the load range up at least one quarter and even up to half of the load range at any particular engine speed. The throttle valve 12 principally being used at wide open throttle operation.

Figure 2:
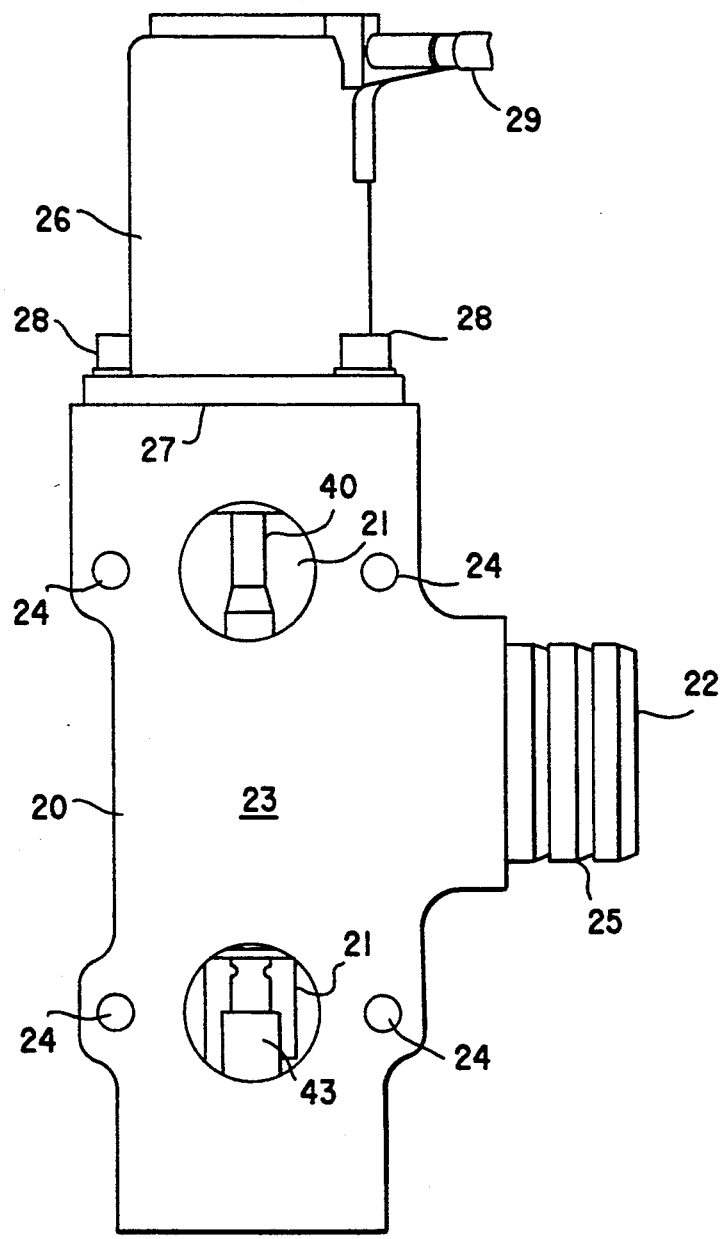
FIG. 2 is a side elevation of a secondary air control device.
Figure 3:
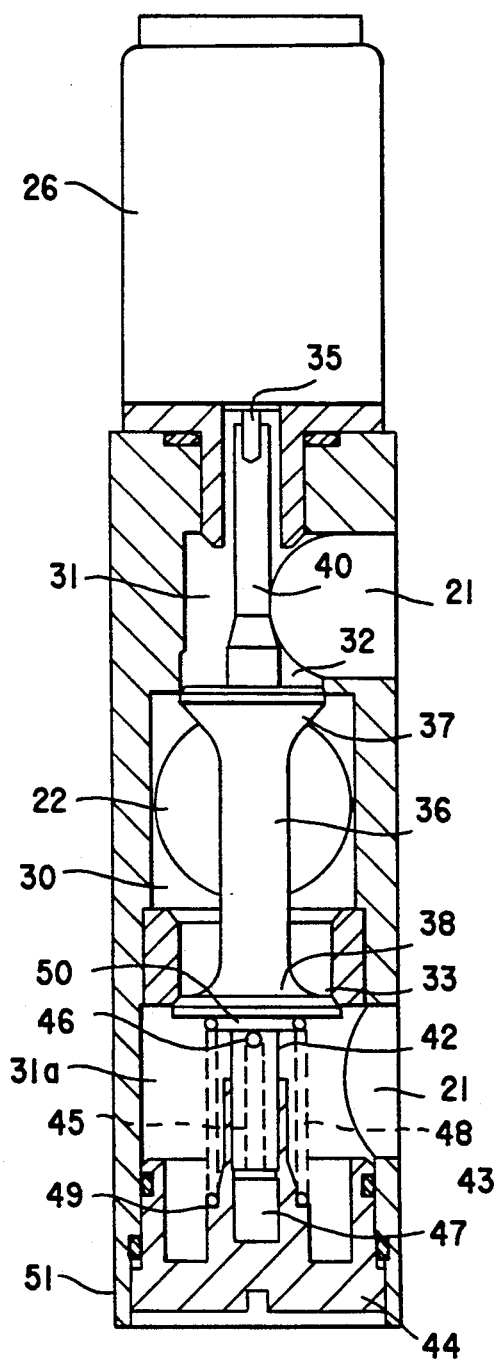
FIG. 3 is a sectional elevation along the line 3—3 in FIG. 2.

Referring now to FIGS. 2 and 3 of the drawings, there is illustrated therein one practical construction of the control valve 18 provided in the secondary passage 13.

The control valve comprises an elongated body 20 having two axially spaced outlet ports 21 and an inlet port 22. The two outlet ports 21 are located in a plane substantially at right angles to the plane in which the inlet port 22 is located. The outlet ports 22 are located in a substantially flat face 23 of the body 20 so that a suitable plenum chamber can be mounted onto the body to communcate with each of the outlet ports 21, with the plenum chamber having provision for connecting a duct thereto though which the air delivered through the outlet ports 21 is conveyed to the engine induction manifold 7 in FIG. 1. The plenum chamber (not shown) may be conveniently mounted to the body 20 by bolts passing though holes 24 provided in the flat face 23 of the body 20.

The inlet port 22 has an extending sleeve 25 with a series of peripheral grooves. A suitable conduit conveniently of a flexible construction can be fitted to and clamped about the sleeve 25 and is connected to the air box (not shown) of the engine from which air is supplied to the interior of the body 20 as hereinafter described.

Mounted on one axial end of the body 20 is a linear electric motor 26 having a mounting flange 27 with mounting bolts 28 securing the flange 27 to the body 20. The motor receives electrical power through the terminal 29.

Referring now to the sectional view in FIG. 3, the body 20 has a generally central internal chamber 30, in direct communication with the inlet port 22, and respective end chambers 31 and 31a communicating with the respective outlet ports 21. Coaxial transfer ports 32 and 33, arranged co-axial with the spindle 35 of the linear motor 26, respectively provide communication between the central chamber 30 and the end chambers 31 and 31a. The spool valve 36 has spaced co-axial valve heads 37 and 38 which seat in the ports 32 and 33 respectively.

The spindle 40 formed integral with the spool valve 36 is coupled to the motor spindle 35 of the linear motor 26. At the opposite end of the spool valve 36, a further spindle 42 is provided integral therewith, and supported for axial sliding movement in the sleeve 43 formed integral with the cap 44. The spindle 42 is provided with an axial passage 45 and a communicating transfer passage 46 so that fluid will not be trapped in the lower end of the bore 47 in the sleeve 43 and thereby hinder the free movement of the spool valve 36.

A helical compression spring 48 is seated on the shoulder 49 formed on the inner face of the cap 44 and at the opposite end is seated about the shallow boss 50 provided on the valve head 38. The cap 44 is threadable received in the end of the body 20 at 51 so that the pre-load applied by the spring 48 on the spool valve 36 can be adjusted.

It will be appreciated from the above description that the spool valve 36 can be moved axially in the body 20 by the operation of the linear motor 26 to vary the degree of opening of the ports 32 and 33, thereby controlling the rate of the flow of air from the central chamber 30 into the respective end chambers 31 and 31a, and hence out through the outlet ports 21. The double ended form of the spool valve 36 and the co-operating dual end chambers 32,33 achieve a substantially balanced pressure on the spool valve 36 so that the power required to be supplied by the linear motor 26 to operate the spool valve 33 is substantially reduced and is basically only required to overcome the load applied by the spring 48 to the spool valve 36.

This contributes, to the reduction in the initial costs Of the linear motor 26 and also reduces the energy drain on the electrical system of the engine by the operation of the valve mechanism.

The above described construction of the electric motor driven valve, as illustrated in FIGS. 2 and 3, is only one example of a suitable valve for use in the control of the air flow in the secondary air passage. Numerous other constructions could be used.

In reference to the ECU referred to in this specification, it may be of any of the known constructions and programmed to suit particular performance requirements. The use of such ECU for generally controlling the fuelling rate and air supply to internal combustion engines is well known and has therefore not been described in detail herein.

As previously indicated the valve 18 as just described with reference to FIGS. 2 and 3 may also be used in the control of engine overrun. The use of the valve as described does not require constructional change in order to perform this function, only suitable programming of the ECU 17 is required. In this regard, the ECU 17 is programmed to detect a rate of increase in engine speed above a preset level simultaneous with the driver actuated or throttle control linkage 14 returning to the throttle valve closed position. This combination of engine parameters indicates the existence of conditions to result in engine overrun, and the ECU is programmed so that upon the existence thereof, the motor 26 is energised to locate the spool valve 30 in the maximum open position to permit maximum supply of air through the secondary passage 13.

The ECU 17 is also progammed to only move the spool valve 30 to the maximum open position when the above combination of engine parameters is detected and the engine speed is above a preset value such as, for example, 2500 RPM, and to maintain the spool valve open for a select time internally or until the engine speed falls to below the preset engine speed. Preferably the ECU 17 is programmed so that when the engine speed falls below the preset value while the engine is in overrun, the spool valve 30 is fully closed to maximise the vacuum in the engine induction system.

Finally the ECU 17 is programmed to terminate fuel supply to the engine while the ECU is executing an overrun speed control sequence.

Figure 4:
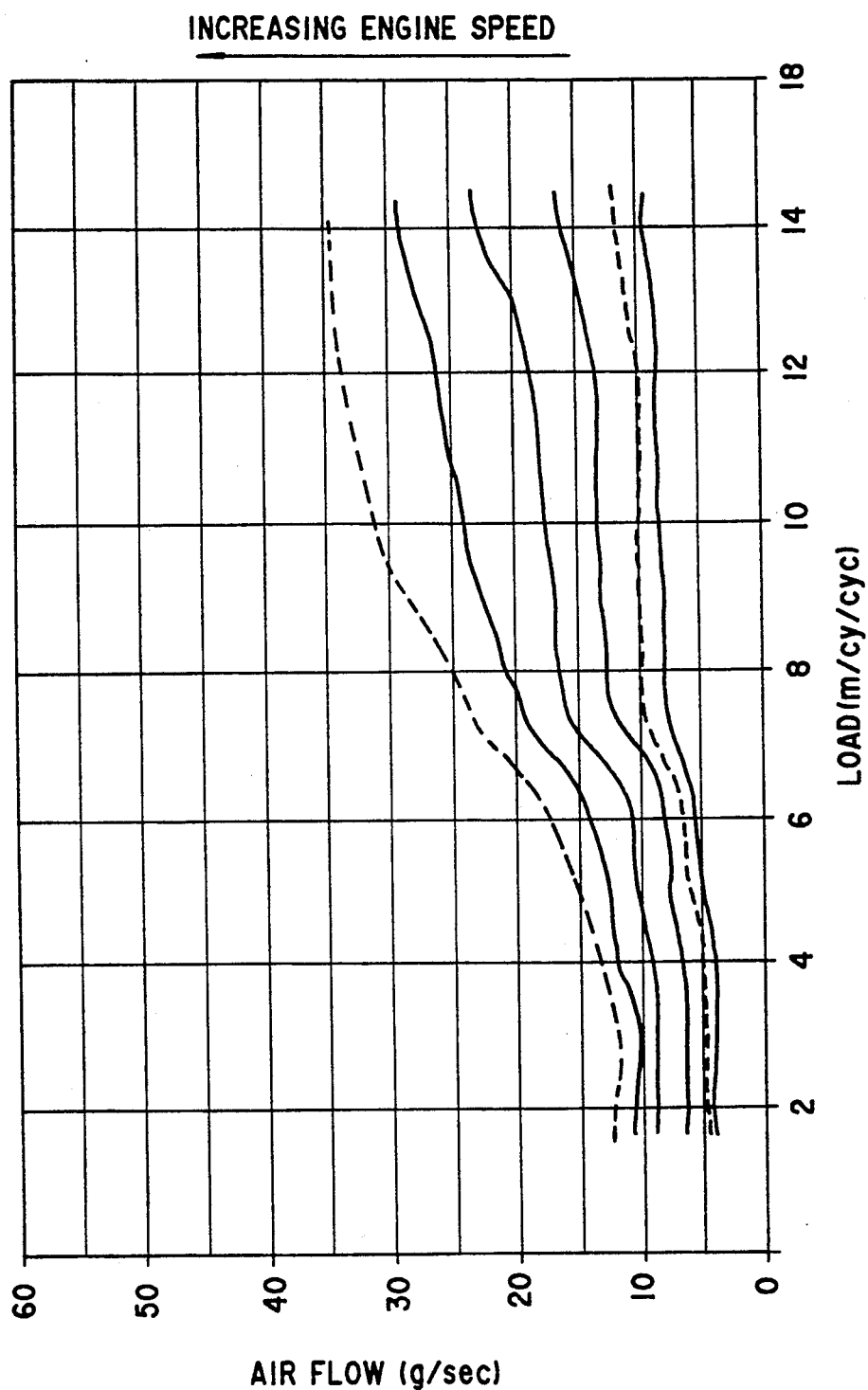
FIG. 4 is a graph of total air flow to the engine over a range of fuelling rates and engine speeds.
Figure 5:
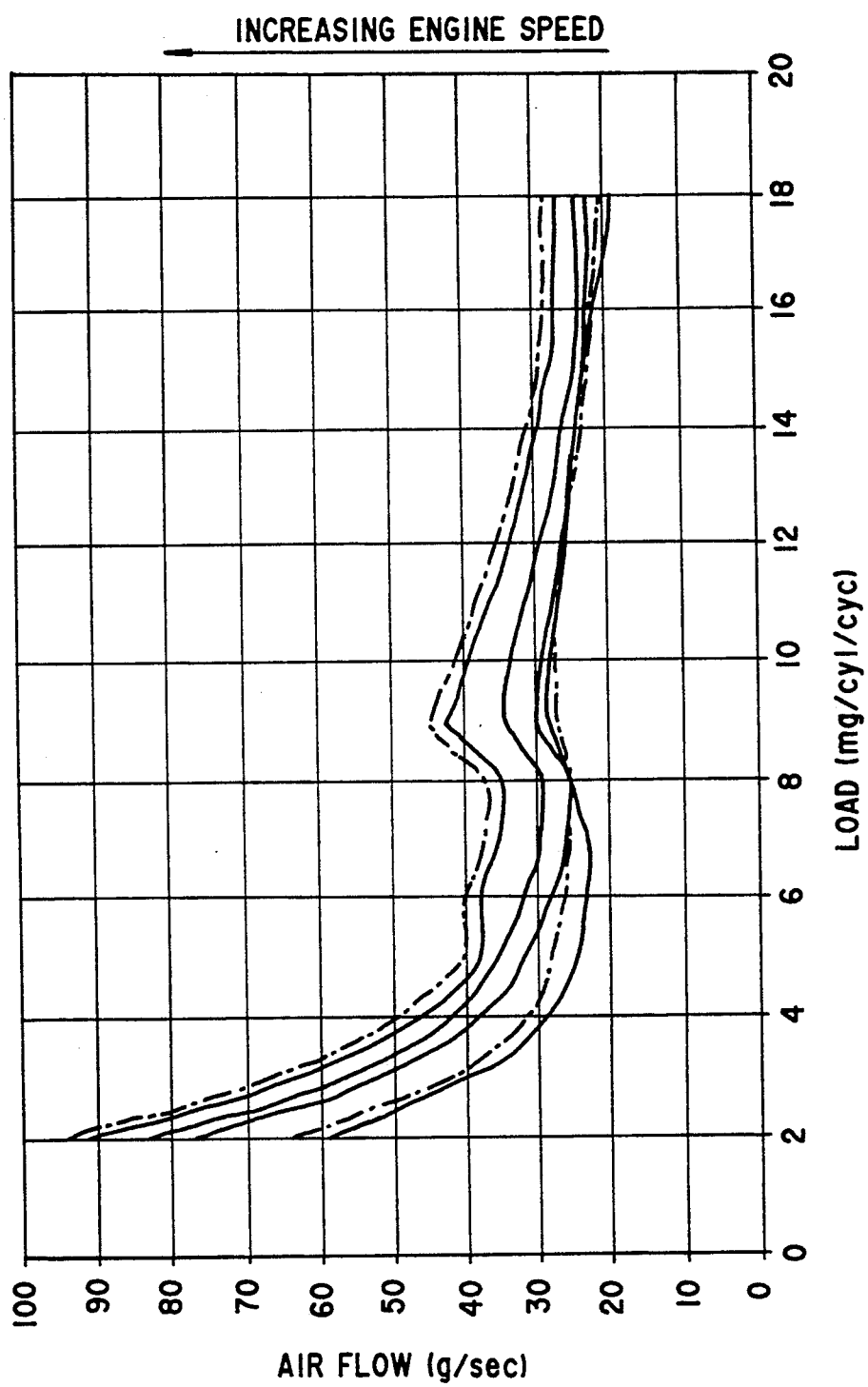
FIG. 5 is a graph of air/fuel ratios for the air and fuel rate as shown in FIG. 4.

The advantage of the air supply system as previously described can be appreciated from a consideration of the information presented in the graphs forming FIGS. 4 and 5. The graphs respectively show rate of total air supply and the total air/fuel ratio against fuel supply measured on a per cylinder per cycle of the engine basis. The information was obtained from tests on a 1200 c.c. three cylinder two stroke cycle engine with direct fuel injection and spark ignition. In respect of such an engine in an appropriate vehicle the upper end of the driving cycle under United States of America emission regulations corresponds approximately to a fuelling rate of 9 mg per cylinder per cycle (mg/cyl/cyc) that is about 40% of the engines rated output. In normal use of the vehicle on the road the fuelling rate of the engine could be up to about 15 mg/cyl/cyc, 60% of rated output. It is to be specifically noted in FIG. 5 the air/fuel ratio is on the basis of the total quantity of fuel supplied per cylinder per cycle and thus the air/fuel ratios are relatively lean. However, the air/fuel ratio at the spark plug will be considerably richer due to other combustion system controls such as injection and ignition timing and fuel stratification.

Referring now to the graphs shown in FIGS. 4 and 5, it will be noted from FIG. 4 that in the load range requiring a fuelling rate of 2 to about 9 mg/cyl/cyc, that is up to 40% of rated output, the rate of air supply to the engine remains substantially constant, representing a substantial reduction of air/fuel ratio as seen in FIG. 5 as the fuelling rate increases. This can be achieved by the use of the second air passage as the sole air supply to the engine, and controlling the flow rate therethrough by the ECU to achieve the substantially constant rate of air supply not under the direct control of the driver actuated accelerator pedal or throttle control.

It will also be seen from FIG. 4 that in the lower speed range the air supply rate is substantially constant over a substantial part of the load range even after the throttle valve has been brought into operation. This is achieved by controlling the air flow through the secondary air passage to impart compensation for the increasing flow through the first air passage.

FIG. 5 shows that in the engine load range of about 5 to 8 mg/cyl/cyc, that is 20% to 35% of rated output, the delivered air/fuel ratio is somewhat fuel rich and this is achieved by the use of the second air passage under the control of the ECU to reduce the air flow even though the driver actuated mechanism would, if directly coupled to the engine throttle valve, increase the air flow rate. The enrichment of the air/fuel ratio in this area of engine operation contributes to the control of NOx emissions as the control of NOx is related to the overall air/fuel ratio of the engine charge rather than the localised air/fuel ratio at the spark plug.

The compliance of a vehicle with the various regulations governing emissions is determined in relation to a prescribed driving cycle, which in respect to a vehicle incorporating the engine from which the data for FIGS. 4 and 5 was obtained, is generally in the fuelling rate range of 2 to 9 or 10 mg/cyl/cyc, that is up to about 40% of engine rated output. Accordingly it is important to control NOx within the area of operation, and the use of a second air passage with independent control of air flow therethrough to the engine, in combination with a conventional throttle controlled first or main air passage, assists in obtaining appropriate control of NOx by control of the air/fuel ratio.

We claim:

1. An internal combustion engine air supply system comprising:
   a first air intake passage through which air can flow to the engine;
   a first control means operable to vary the air flow rate through the first passage;
   a driver actuated mechanism operatively coupled to said first control means to vary the air flow rate through the first passage to the engine in response to the driver demand;
   a second air intake passage through which air can flow to the engine;
   a second control means operable to vary the air flow rate through the second passage to the engine; and
   an actuator means operable in response to sensed engine operating conditions to operate the second control means to vary the air flow rate through the second passage to the engine, wherein
   said first control means and second control means are operable independently, so that the air supplied to the engine may be solely through one of the first or second air passages or simultaneously through both, and said actuator means is arranged so that, at least during a first part of said initial portion of driver induced movement of said actuator means, said second control means does not substantially increase the mass of air delivered per cylinder through said second air intake passage.

2. An internal combustion engine air supply system as claimed in claim 1, wherein the driver actuated mechanism is arranged so the first control means maintains the first air passage closed over an initial portion of the driver induced movement from the engine idle position of the driver actuated mechanism so substantially all the air supply to the engine is through the second air passage.

3. An internal combustion engine air supply system as claimed in claim 2, wherein said initial portion of driver induced movement extends from the engine idle position of said mechanism to at least the position of the mechanism corresponding to one quarter maximum engine load.

4. An internal combustion engine air supply system as claimed in any one of the preceding claims including an electronic control unit to receive inputs from a plurality of sensor means indicating the engine operating condition including a sensor means indicating the position of the driver operated mechanism and an air flow rate sensor means to sense the actual total air supply to the engine and determine from at least some of said input the fuel and air quantities required to establish a selected air/fuel ratio, said electronic control unit further being programmed to compare the sensed actual total air supply with the determined air quantity and to actuate said second control means to adjust the air flow rate through the second passage to correct any variation between the actual and the determined air supply to the engine.

5. An internal combustion engine air supply as claimed in claim 4, wherein said plurality of sensor means includes, and engine speed sensor means, and said electronic control unit is programmed to determine from inputs from at least some of said sensor means an engine operating condition conducive to engine speed overrun, and said electronic control unit being arranged to respond to detection of said condition:
 (1) terminate the supply of fuel to the engine;
 (2) operate the second control means to permit the maximum air flow rate through the second air passage;
 (3) maintain (1) and (2) until the engine speed falls below a preset value.

6. An internal combustion engine air supply system as claimed in claim 5, wherein the electronic control unit is arranged to operate the second control means to prevent air flow through the second air passage after the engine speed has fallen below said preset speed and while said engine operating conditions continue.

7. An internal combustion engine air supply as claimed in any one of claims 1 to 3, wherein said actuator means includes an electronic control unit arranged to receive input from a plurality of sensor means including engine speed sensor means and driver actuated mechanism position sensor means, said electronic control unit being programmed to determine from inputs from at least some of said sensor means an engine operating condition conducive to engine speed overrun, and said electronic control unit being arranged to respond to detection of said condition to:
 (1) terminate the supply of fuel to the engine;
 (2) operate the second control means to permit the maximum air flow rate through the second air passage;
 (3) maintain (1) and (2) until the engine speed falls below a preset value.

8. An internal combustion engine air supply system as claimed in claim 7, wherein the electronic control unit is arranged to operate the second control means to prevent air flow through the second air passage after the engine speed has fallen below said preset speed and while said engine operating conditions continue.

9. An internal combustion engine air supply system as claimed in claim 2, further comprising an electronic control means for receiving inputs from a plurality of sensor means for indicating the engine operating condition including a sensor indicating the position of a driver operated mechanism, and for determining from at least some of the inputs the mass of fuel and air required per cylinder by the engine to establish a selected air/fuel ratio, said electronic control means further being for actuating said second control means during said first part of the initial portion of said driver induced movement of said actuator means to deliver the mass of air per cylinder.

10. An internal combustion engine air supply system comprising:
 a first air intake passage through which air can flow to the engine;
 a first control means for varying the air flow rate through the first passage;
 a driver actuated means operatively coupled to said first control means, for varying the air flow rate through the first passage to the engine in response to the driver demand;
 a second air intake passage through which air can flow to the engine;
 a control means for varying the air flow rate through the second passage to the engine; and
 an actuator means operable in response to sensed engine operating conditions, for operating the second control means so as to vary the air flow rate through the second passage to the engine,
 said first control means and second control meals being operable so that the air supplied to the engine may be solely through one of the first or second air passages or simultaneously through both, wherein said driver actuated means and said actuator means are operated such that first during an initial portion of driver induced movement of the driver actuated means from an engine idle position, substantially all the air supply to the engine is through the second air passage, and
 said actuator means is arranged so that, at least during a first part of said driver induced movement from an engine idle position, said second control means does not substantially increase the mass of air delivered per cylinder through said second air intake passage.

11. An internal combustion engine air supply system comprising:
 means for controlling the fuel per cylinder delivered to the engine in response to drive demand;
 a first air intake passage through which air can flow to the engine;

a second air intake passage through which air can flow to the engine;

control means for controlling the delivered mass of air per cylinder in response to driver demand and to engine operating conditions; and an actuator means connected to said control means and operable in response to sensed engine operating conditions, for varying the air flow through the second passage to the engine, said air delivery control means controlling the delivered mass of air per cylinder so that the air supplied to the engine may be solely through one of the first or second air passages or simultaneously through both, and said air delivery control means controlling the first air passage during the engine idle so that substantially all the air supply to the engine is through the second air passage.

12. An internal combustion engine air supply system as claimed in claim 11, wherein the engine operation near idle extends from an engine idle position to at least quarter maximum engine load.

13. An internal combustion engine air supply system as claimed in claim 11, wherein said control means includes a driver actuated mechanism operatively coupled so as to vary the air flow through the first passage to the engine in response to the driver demand.

14. An internal combustion engine air supply system as claimed in claim 13, further comprising:

an electronic control means operatively connected for receiving inputs from a plurality of sensor means indicating the engine operating condition, including a sensor means indicating the position of the driver actuated mechanism and an air flow sensor means to sense the actual total air supply to the engine and determine from at least some of said input the fuel and air quantities required to establish a selected air/fuel ratio, said electronic control means further being formed for comparing a sensed actual total air supply with a determined air quantity and for actuating said air delivery control means to adjust the air flow through the second passage to correct any variation between the actual and the determined air supply to the engine.

15. An internal combustion engine air supply system comprising:

means for controlling the fuel per cylinder delivered to the engine in response to drive demand;

a first air intake passage through which air can flow to the engine;

a second air intake passage through which air can flow to the engine; and means for controlling the delivered mass of air per cylinder in response to driver demand and in response to sensed engine operating conditions, said control means further being for varying the air flow through the second passage to the engine, said air delivery control means controlling the delivered mass of air per cylinder so that the air supplied to the engine may be solely through one of the first or second air passages or simultaneously through both, and further said air delivery control means controlling the first air passage during the engine idle so that substantially all the air supply to the engine is through the second air passage.

16. An internal combustion engine air supply system as claimed in claim 15, wherein the engine operation near idle extends from an engine idle position to at least quarter maximum engine load.

17. An internal combustion engine air supply system as claimed in claim 15, wherein said control means includes a driver actuated mechanism operatively coupled so as to vary the air flow through the first passage to the engine in response to the driver demand.

18. An internal combustion engine air supply system as claimed in claim 17, further comprising:

an electronic control means operatively connected for receiving inputs from a plurality of sensor means indicating the engine operating condition, including a sensor means indicating the position of the driver actuated mechanism and an air flow sensor means to sense the actual total air supply to the engine and determine from at least some of said input the fuel and air quantities required to establish a selected air/fuel ratio, said electronic control means further being formed for comparing a sensed actual total air supply with a determined air quantity and for actuating said air delivery control means to adjust the air flow through the second passage to correct any variation between the actual and the determined air supply to the engine.

19. A vehicle having internal combustion engine which incorporates an air supply control system, said air supply control system comprising:

means for controlling the fuel per cylinder delivered to the engine in response to drive demand;

a first air intake passage through which air can flow to the engine;

a second air intake passage through which air can flow to the engine;

control means for controlling the delivered mass of air per cylinder in response to driver demand and to engine operating conditions; and an actuator means connected to said air delivery control means and operable in response to sensed engine operating conditions, for varying the air flow through the second passage to the engine, said air delivery control means controlling the delivered mass of air per cylinder so that the air supplied to the engine may be solely through one of the first or second air passages or simultaneously through both, and said air delivery control means controlling the first air passage during the engine idle so that substantially all the air supply to the engine is through the second air passage.

20. A vehicle as claimed in claim 19, wherein the engine operation near idle extends from an engine idle position to at least quarter maximum engine load.

21. A vehicle as claimed in claim 19, wherein said air delivery control means includes a driver actuated mechanism operatively coupled so as to vary the air flow through the first passage to the engine in response to the driver demand.

22. A vehicle as claimed in claim 21, further comprising:

an electronic control means operatively connected for receiving inputs from a plurality of sensor means indicating the engine operating condition, including a sensor means indicating the position of the driver actuated mechanism and an air flow sensor means to sense the actual total air supply to the engine and determine from at least some of said input the fuel and air quantities required to establish a selected air/fuel ratio, said electronic control means further being formed for comparing a sensed actual total air supply with a determined air quantity and for actuating said air delivery control means to adjust the air flow through the second passage to correct any variation between the actual and the determined air supply to the engine.

23. A vehicle powered by an internal combustion engine, said engine having an air supply control system, said air supply control system comprising:
   means for controlling the fuel per cylinder delivered to the engine in response to drive demand;
   a first air intake passage through which air can flow to the engine;
   a second air intake passage through which air can flow to the engine; and
   means for controlling the delivered mass of air per cylinder in response to driver demand and in response to sensed engine operating conditions, said air delivery control means further being for varying the air flow through the second passage to the engine,
   said air delivery control means controlling the delivered mass of air per cylinder so that the air supplied to the engine may be solely through one of the first or second air passages or simultaneously through both, and
   said control means controlling the first air passage during the engine idle so that substantially all the air supply to the engine is through the second air passage.

24. A vehicle as claimed in claim 23, wherein the engine operation near idle extends from an engine idle position to at least quarter maximum engine load.

25. A vehicle as claimed in claim 23, wherein said air delivery control means includes a driver actuated mechanism operatively coupled so as to vary the air flow through the first passage to the engine in response to the driver demand.

26. A vehicle as claimed in claim 25, further comprising:
   an electronic control means operatively connected for receiving inputs from a plurality of sensor means indicating the engine operating condition, including a sensor means indicating the position of the driver actuated mechanism and an air flow sensor means to sense the actual total air supply to the engine and determine from at least some of said input the fuel and air quantities required to establish a selected air/fuel ratio, said electronic control means further being formed for comparing a sensed actual total air supply with a determined air quantity and for actuating said air delivery control means to adjust the air flow through the second passage to correct any variation between the actual and the determined air supply to the engine.

27. A method for controlling an air supply to an internal combustion engine wherein air is supplied to the engine by an air supply system which includes a first air intake passage through which air can flow to the engine, a second air intake passage through which air can flow to the engine and an actuator means operable in response to sensed engine operating conditions, for varying the air flow through the second passage to the engine, said method comprising the steps of:
   controlling the fuel per cylinder delivered to the engine in response to driver demand;
   varying the air flow through the second passage with the actuator means; and
   controlling the delivered mass of air per cylinder through the first air passage in response to driver demand and to engine operating conditions, said step of controlling the delivered mass of air including the steps of
   controlling the delivered mass of air per cylinder so that the air supplied to the engine may be solely through one of the first or second air passages or simultaneously through both, and
   controlling the air flow through the first air passage during the engine idle so that substantially all the air supply to the engine is through the second air passage.

28. A method for controlling an air supply system for an internal combustion engine as claimed in claim 27, further comprising the steps of:
   sensing the position of a driver operated mechanism controlling the air flow through the first air passage;
   sensing the actual total air supply to the engine;
   determining the fuel and air quantities required to establish a selected air/fuel ratio based on at least the position of the driver operated mechanism and the actual total air supply to the engine;
   comparing a sensed actual total air supply with a determined air quantity; and
   adjusting the air flow through the second air passage to correct any variation between the actual and the determined air supply to the engine.

29. An internal combustion engine having an air supply system, said air supply system comprising:
   means for controlling the fuel per cylinder delivered to the engine in response to drive demand;
   a first air intake passage through which air can flow to the engine;
   a second air intake passage through which air can flow to the engine;
   control means for controlling the delivered mass of air per cylinder in response to driver demand and to engine operating conditions; and
   an actuator means connected to said air delivery control means and operable in response to sensed engine operating conditions, for varying the air flow through the second passage to the engine,
   said air delivery control means controlling the delivered mass of air per cylinder so that the air supplied to the engine may be solely through one of the first or second air passages or simultaneously through both, and
   said air delivery control means controlling the first air passage during the engine idle so that substantially all the air supply to the engine is through the second air passage.

30. An internal combustion engine as claimed in claim 29, wherein the engine operation near idle extends from an engine idle position to at least quarter maximum engine load.

31. An internal combustion engine as claimed in claim 29, wherein said air delivery control means includes a driver actuated mechanism operatively coupled so as to vary the air flow through the first passage to the engine in response to the driver demand.

32. An internal combustion engine as claimed in claim 31, further comprising:
   an electronic control means operatively connected for receiving inputs from a plurality of sensor means indicating the engine operating condition, including a sensor means indicating the position of the driver actuated mechanism and an air flow sensor means to sense the actual total air supply to the engine and determine from at least some of said input the fuel and air quantities required to establish a selected air/fuel ratio, said electronic control means further being formed for comparing a sensed actual total air supply with a determined air quantity and for actuating said air delivery control means to adjust the air flow through the second passage to correct any variation between the actual and the determined air supply to the engine.

33. An internal combustion engine having an air supply system, said air supply system comprising:
   means for controlling the fuel per cylinder delivered to the engine in response to drive demand;
   a first air intake passage through which air can flow to the engine;
   a second air intake passage through which air can flow to the engine; and
   means for controlling the delivered mass of air per cylinder in response to driver demand and in response to sensed engine operating conditions, said air delivery control means further being for varying the air flow through the second passage to the engine,
   said air delivery control means controlling the delivered mass of air per cylinder so that the air supplied to the engine may be solely through one of the first or second air passages or simultaneously through both, and
   said air delivery control means controlling the first air passage during the engine idle position so that substantially all the air supply to the engine is through the second air passage.

34. An internal combustion engine as claimed in claim 33, wherein the engine operation near idle extends from an engine idle position to at least quarter maximum engine load.

35. An internal combustion engine as claimed in claim 33, wherein said air delivery control means includes a driver actuated mechanism operatively coupled so as to vary the air flow through the first passage to the engine in response to the driver demand.

36. An internal combustion engine as claimed in claim 35, further comprising:
   an electronic control means operatively connected for receiving inputs from a plurality of sensor means indicating the engine operating condition, including a sensor means indicating the position of the driver actuated mechanism and an air flow sensor means to sense the actual total air supply to the engine and determine from at least some of said input the fuel and air quantities required to establish a selected air/fuel ratio, said electronic control means further being formed for comparing a sensed actual total air supply with a determined air quantity and for actuating said air delivery control means to adjust the air flow through the second passage to correct any variation between the actual and the determined air supply to the engine.

37. A trim control system for an air supply system in an internal combustion engine, said air supply system including a first air intake passage and a second air intake passage through which air can flow to the engine and a driver actuated mechanism operatively coupled so to vary the air flow through the first passage to the engine in response to the drive demand during operation beyond near engine idle, said trim control system comprising:
   an actuator means for varying the air flow through the second air passage to the engine; and
   control means for controlling the delivered mass of air per cylinder to driver demand, wherein the air supplied to the engine may be solely through one of the first or second air passages or simultaneously through both,
   said control means controlling the air flow through the first air passage during the engine idle and during operation near idle so that the first air passage is substantially closed, and controlling the air flow through the second passage with the actuator means wherein substantially all the air supplied to the engine is through the second air passage during engine idle and during operation near engine idle, and
   said control means adjusting the air flow through the second air passage in response to the first air passage being controlled through the driver actuated mechanism and to engine operating conditions during operation beyond near engine idle so as to provide a controlled supplemental quantity of air in addition to the air flow through the first air passage.

38. A trim control system as claimed in claim 37, wherein the engine operation near idle extends from an engine idle position to at least quarter maximum engine load.

39. A trim control system as claimed in claim 37, said air delivery control means including an electronic control unit operatively connected for receiving inputs from a plurality of sensor means indicating the engine operating condition, including a sensor means indicating the position of the driver actuated mechanism and an air flow sensor means to sense the actual total air supply to the engine and determine from at least some of said input the fuel and air quantities required to establish a selected air/fuel ratio, said electronic control unit further being formed for comparing a sensed actual total air supply with a determined air quantity and for actuating said air delivery control means to adjust the air flow through the second passage to correct any variation between the actual and the determined air supply to the engine.

40. A trim control system for an air supply system in an internal combustion engine, said air supply system including a first air intake passage and a second air intake passage through which air can flow to the engine, said trim control system comprising:
   a driver actuated mechanism operatively coupled so to vary the air flow through the first passage to the engine in response to the driver demand during operation beyond near engine idle; and
   means for controlling the delivered mass of air per cylinder in response to driver demand and to sensed engine operating conditions, said air delivery control means further being for varying the air flow through the second passage to the engine, wherein the air supplied to the engine may be solely through one of the first or second air passages or simultaneously through both, and
   said air delivery control means controlling the air flow through the first air passage during the engine idle and during operation near idle so that the first air passage is substantially closed, and controlling the air flow through the second passage with the actuator means wherein substantially all the air supplied to the engine is through the second air passage during engine idle and during operation near engine idle, and further said air delivery control means adjusting the air flow through the second air passage in response to the first air passage being controlled through the driver actuated mechanism and to engine operating conditions during operation beyond near engine idle so as to provide a controlled supplemental quantity of air in addition to the air flow through the first air passage.

41. A trim control system as claimed in claim 40, wherein the engine operation near idle extends from an engine idle position to at least quarter maximum engine load.

42. A trim control system as claimed in claim 40, said air delivery control means including an electronic control unit operatively connected for receiving inputs from a plurality of sensor means indicating the engine operating condition, including a sensor means indicating the position of the driver actuated mechanism and an air flow sensor means to sense the actual total air supply to the engine and determine from at least some of said input the fuel and air quantities required to establish a selected air/fuel ratio, said electronic control unit further being formed for comparing a sensed actual total air supply with a determined air quantity and for actuating said air delivery control means to adjust the air flow through the second passage to correct any variation between the actual and the determined air supply to the engine.

43. A method for controlling an internal combustion engine having an air supply system which includes first and second air intake passages through which air can flow to the engine, and an actuator means operable in response to sensed engine operating conditions, for varying the air flow through the second passage to the engine, said method comprising the steps of:
controlling the fuel per cylinder delivered to the engine in response to driver demand;
controlling the air flow through the second passage with the actuator means; and
controlling the delivered mass of air per cylinder through the first air passage in response to driver demand and to engine operating conditions, said step of controlling the delivered mass of air including the steps of
controlling the delivered mass of air per cylinder so that the air supplied to the engine may be solely through one of the first or second air passages or simultaneously through both, and
controlling the air flow through the first air passage during the engine idle and during operation near engine idle so that substantially all the air supply to the engine is through the second air passage.

44. A method for controlling an internal combustion engine as claimed in claim 43, further comprising the step of:
sensing the position of a driver operated mechanism controlling the air flow through the first air passage;
sensing the actual total air supply to the engine;
determining the fuel and air quantities required to establish a selected air/fuel ratio based on at least the position of the driver operated mechanism and the actual total air supply to the engine;
comparing a sensed actual total air supply with a determined air quantity; and
adjusting the air flow through the second air passage to correct any variation between the actual and the determined air supply to the engine.

45. A method for controlling an air supply trimming system in an internal combustion engine wherein air is supplied to the engine by an air supply system having first and second air intake passages through which air can flow to the engine, a driver actuated mechanism operatively connected to control the air flow through the first air passage and an actuator means operable in response to sensed engine operating conditions for controlling the air flow through the second air passage, wherein the delivered mass of air per cylinder is controlled so that the air supplied to the engine may be solely through one of the first or second air passages or simultaneously through both, and the first air passage being substantially closed during engine idle and during operation near idle, and being progressively opened so as to vary the air flow therethrough during operation beyond near engine idle, said method comprising the steps of:
controlling the air flow through the second passage with the actuator means to supply substantially all the air to the engine through the second air passage during engine idle and during operation near engine idle; and
varying the air flow through the second air passage with the actuator means in response to engine operating conditions and opening of the first air passage during operation beyond near engine idle.

46. A method for controlling an air supply trimming system in an internal combustion engine as claimed in claim 45, said step of varying the air flow through the second air passage including steps of:
sensing the position of a driver operated mechanism controlling the air flow through the first air passage;
sensing the actual total air supply to the engine;
determining the fuel and air quantities required to establish a selected air/fuel ratio based on at least the position of the driver operated mechanism and the actual total air supply to the engine;
comparing a sensed actual total air supply with a determined air quantity; and
adjusting the air flow through the second air passage to correct any variation between the actual and the determined air supply to the engine.

47. An internal combustion engine air supply system comprising:
a first air intake passage through which air can flow to the engine;
a first control means for varying the air flow rate through the first passage;
a second air intake passage through which air can flow to the engine;
a second control means varying the air flow rate through the second passage to the engine; and
an actuator means operable in response to driver load demand and engine operating conditions, for operating the first and second control means so as to vary the air flow rate to the engine through said first and/or second air intake passage,
said actuator means being further for operating the first and second control means so that the air supplied to the engine may be solely through one of the first or second air passages or simultaneously through both, wherein said actuator means is operatively arranged so that during an initial increase in driver load demand from an engine idle condition substantially all the air supply to the engine is through the second air passage, and said actuator means is arranged so that, at least during initial increase in said load demand from engine idle condition, said second control means does not substantially increase the mass of air delivered per cylinder through said second air intake passage.

48. An internal combustion engine air supply system as claimed in claim 47, wherein said initial increase in load demand extends from engine idle to at least one quarter maximum engine load.

49. An internal combustion engine air supply system as claimed in claim 47, wherein said initial portion of driver induced movement extends from the engine idle position of said mechanism to at leas the position corresponding to one quarter maximum engine load.

* * * * *

UNITED STATES PATENT AND TRADEMARK OFFICE
CERTIFICATE OF CORRECTION

PATENT NO. : 5,251,597

DATED : October 12, 1993

INVENTOR(S) : Smith et al.

It is certified that error appears in the above-indentified patent and that said Letters Patent is hereby corrected as shown below:

In the Drawings, Figure 5, change "AIR FLOW (q/sec)" to --AIR FUEL RATIO--.

Signed and Sealed this

Twelfth Day of July, 1994

Attest:

BRUCE LEHMAN

Attesting Officer     Commissioner of Patents and Trademarks